Jan. 13, 1970  F. W. WEMMERUS  3,489,119
SHIP CARGO COMPARTMENT
Filed Sept. 4, 1968                                      2 Sheets-Sheet 2
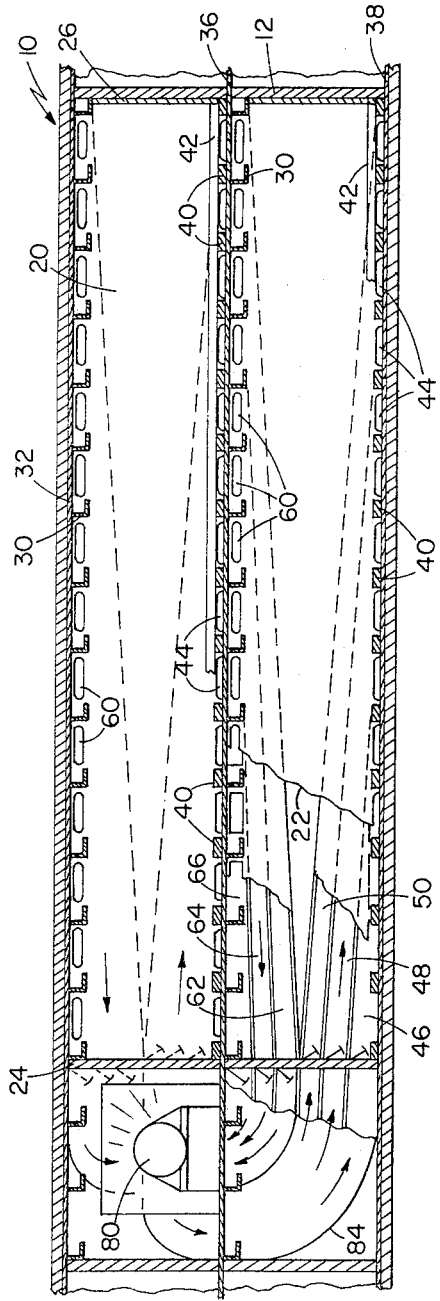
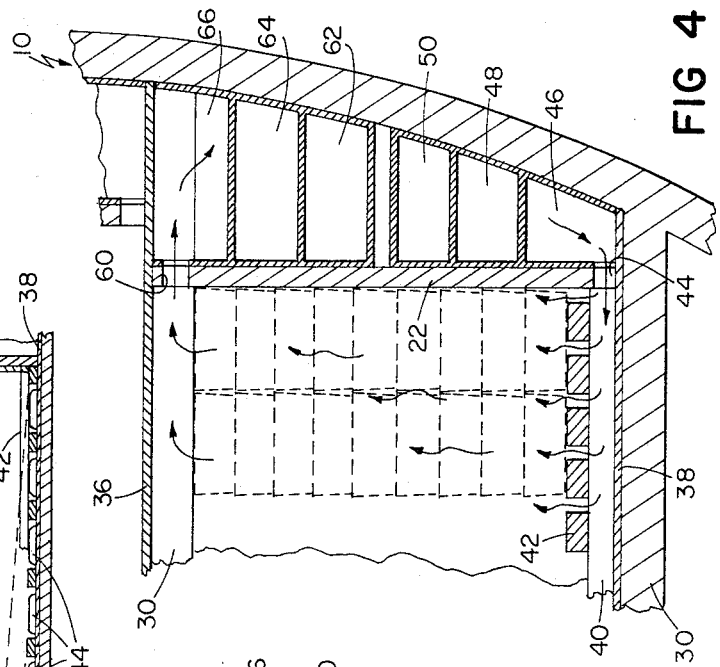
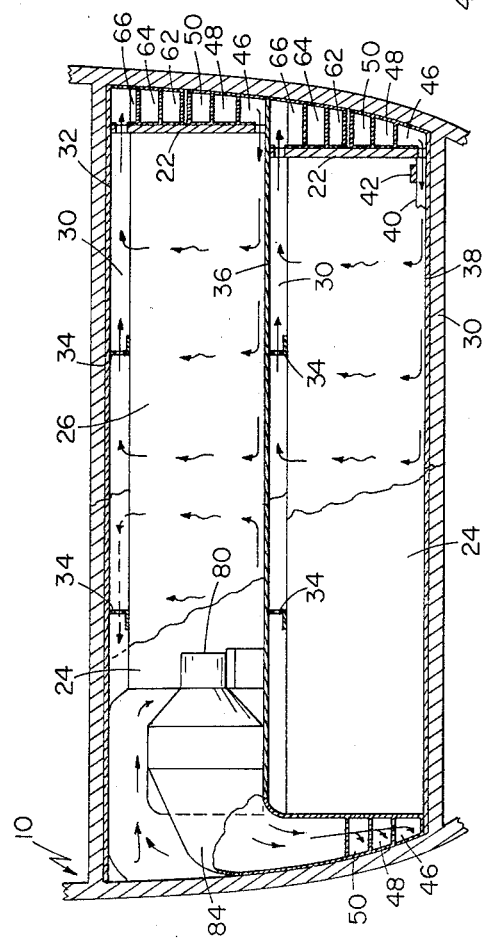

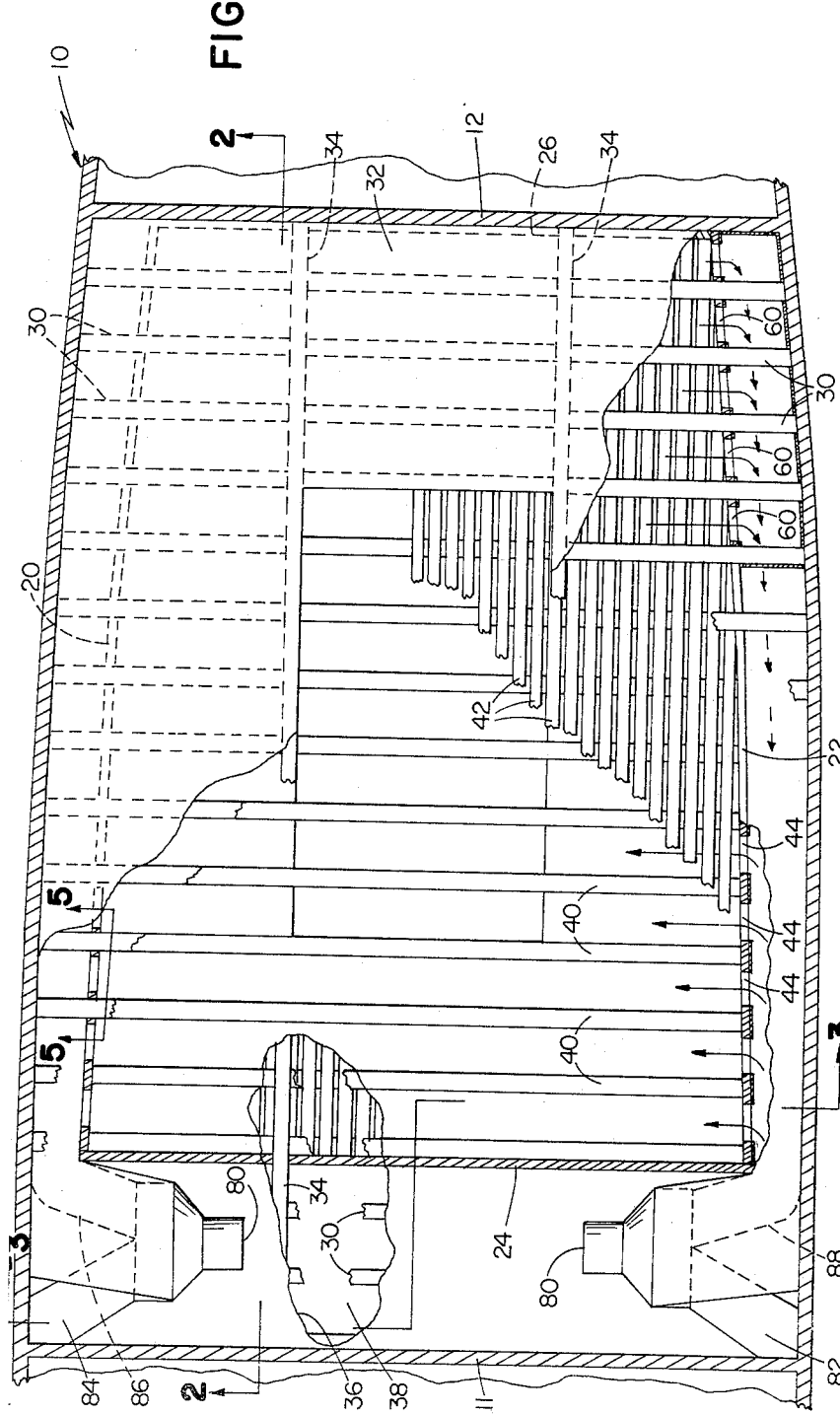

3,489,119
SHIP CARGO COMPARTMENT
Frederick W. Wemmerus, Tenafly, N.J., assignor to United Fruit Company, Boston, Mass., a corporation of New Jersey
Filed Sept. 4, 1968, Ser. No. 757,426
Int. Cl. B63b *11/02;* B63j *2/00*
U.S. Cl. 114—211                     6 Claims

ABSTRACT OF THE DISCLOSURE

A new air-circulating system in a ship's hold cargo compartment has delivery and return ducts for circulating air into the compartment along the bottom of the compartment and out of the compartment along the top of the compartment and utilizes spaces between parallel beams supporting the overhead deck of the compartment and above the cargo to conduct air rising through the cargo to the outlets which preferably are between the beams at the level of the channels.

The system increases the cargo space without sacrificing air quantity or alternatively reduces the deck heights and, therefore, the total height of the ship without sacrificing cargo space or air quantity.

---

This invention relates to an air-recirculating system for ship cargo holds and more particularly to the provision of a structural air-recirculating system which reduces the amount of ship space that must remain cargo-free solely for the purpose of insuring against obstruction of designed optimum air-flow patterns.

The structure herein described is particularly adapted for use in ship transport of boxed fruit, such as bananas, it being well known that bananas during transit have biological activity that requires flushing out $CO_2$, ethylene, and other gases which, if allowed to accumulate to undue content around the bananas, become harmful to the bananas and prevent their storage without controlled ventilation in addition to desired refrigeration.

Robson, one of the workers in the field of ship cargo ventilation in the 1930's (see Patent No. 1,835,085), was concerned with the amount of deck space occupied by ventilating system construction and proposed, as a solution, the omission of return air ducts so that he could use side space solely for delivery ducts which were run in multiple down the sides of the ship to a series of side bottom inlets leading into the hold. By placing fans at one end of the compartment, his design was intended to draw the air upwardly through the cargo and then exhaust it fore or aft for recirculation.

The above system has been widely used but experience has shown that in such installations cargo, particularly if boxed, must be limited in height to provide an unobstructed return space of adequate cross section above the top level of the cargo so that an adequate amount of air can be circulated without setting up uneven flow due to paths of least resistance.

Cargo, such as boxed fruit, then has had to be deliberately held below the deck head and always as much as three inches below the bottom of the overhead beams thus losing in each compartment a part of the total ship cargo capacity.

The present invention does away with cross-beam exhaust and utilizes channels formed between parallel overhead deck supporting beams to direct the air towards compartment outlets at the ends of the channels. It thus permits cargo packing right up to the lowest level of the overhead deck beams, and sometimes to even a higher level in between them because the overlying channels between the beams permit unobstructed flow to the ports adjacent the ends of the channels. The deck height may thus be designed to be only slightly greater than a multiple of standard box height.

Where the beams are transverse, part of the side delivery and return duct space is derived from arranging the side walls of the compartment vertically as is anyway best for receiving rectilinear cargo units, thus devoting ship flare space to duct space which otherwise would be wasted space.

The above and other advantages of the invention will be better understood when taken in connection with a description of a typical embodiment of the invention as shown in the drawings wherein:

FIG. 1 is a sectional plan view taken along the deck of a ship with the major portion of the deck broken away to show underlying structure;

FIG. 2 is a side elevational view of three decks taken along the line 2—2 of FIG. 1;

FIG. 3 is a cross sectional view taken along the line 3—3 of FIG. 1;

FIG. 4 is an enlarged detailed view of a portion of the structure shown in FIG. 3;

FIG. 5 is a detailed cross sectional view taken along the line 5—5 of FIG.1;

FIG. 6 is a view similar to FIG. 5 of a modified structure; and

FIG. 7 is another detailed view like that of FIG. 5 showing a still further modified structure.

FIG. 1 shows a hold within the insulation lining 10 in a ship hull contained between bulkheads 11 and 12. Set up within the hold are superposed cargo compartments defined by vertical side walls 20 and 22 connected at each end by unapertured vertical walls 24 and 26, the side walls 20 and 22 for the lower compartment being set in as shown in FIG. 3 because of the curvature of the hull. The vertical walls connect the decks, each compartment having a first deck and a second deck which is overhead with respect to the first deck.

Transverse L-beams 30 support the decks 32, 36 and 38 between longitudinal girders 34. The spaces between the beams 30 form a series of open overhead channels for passage of air parallel to and between the beams.

Each underlying deck 36 and 38 is covered with a cargo supporting grid including spaced transverse bearers 40 and overlying perpendicular slats 42.

Along the base of each side wall 20 and 22 of each compartment and between the bearers 40 are inlet ports 44 which communicate with delivery ducts running lengthwise of the ship through the side spaces outside the side walls 20 and 22 (FIG. 4). In the construction shown, there is indicated a tier of three superposed delivery ducts 46, 58 and 50 on each side of the ship for the lower compartment. Duct 46 serves, as shown in FIG. 2, five inlets 44, 48 serving the next five inlets and 50 serving the last four inlets.

Outlet ports 60 are shown at the top of the bottom compartment in FIG. 2, each being located adjacent the ends of the channels and, in the drawings, between adjacent L-beams and wholly above the lowest level of the beams at their junctures with the side walls.

A tier of exhaust ducts 62, 64 and 66 are located above the tier of delivery ducts and communicate with five, five and four outlet ports 60, as shown in the bottom compartment in FIG. 2. The upper compartment in FIG. 2 is identical to the bottom compartment in the above respects except for dimensions.

FIG. 5 illustrates how fiberboard cartons, in dotted lines, for example containing bananas, can be loaded right up to the L-beams 30 without obstructing the air channels between the beams leading towards the exhaust outlets 60.

In some cases, the boxes, as illustrated in FIG. 7, can even be packed up into the spaces between overhead beams 30; so long as an air channel is left above the top of the cargo.

FIG. 6 indicates how the outlets 60 may be lower so that the spaces above them can be packed with insulation held up as by sheet metal liners or other retaining sheets 70.

It should be understood that the relative cross sectional areas of ducts 46, 48, 50, 62, 64 and 66 are completely arbitrary in the drawings and in practice would be properly related in order to insure even flow of air. The delivery ducts do have progressively decreasing cross sections in the delivery direction, while the return ducts 62, 64, 66 have progressively increasing cross sections in the return direction. Further, girders 34 may be apertured if desired as shown in FIG. 3.

In the construction shown, fan and refrigerating units are located on each ship side beyond the upper compartment between the bulkhead 11 and the cargo compartment wall 24 and serve both compartments as shown in FIG. 2. For this purpose, the fan intakes, at 80, communicate with the exhaust ducts 62, 64 and 66 on both sides of the ship at two levels and the refrigerated air outputs are connected by ducts 82 and 84 to the lower level side delivery ducts 46, 48 and 50, and by ducts 86 and 88 to the upper level side delivery ducts 46, 48 and 50.

By reason of the above construction, larger cargo capacity without sacrifice in the quantity or control of the refrigerated air flow can be secured which is the primary purpose of the invention as above described, it being noted that the air circulates through the delivery ducts to the ports 44, thence athwartship in an inboard direction beneath the grids and up through the cargo and then athwartship outboard in the channels between the beams through the ports 60 into the side exhaust ducts. Because there is no substantial horizontal air travel within the compartment in a direction normal to the spaced beams, return air space between the top of the cargo and the bottoms of the overhead beams (as would be needed were fore or aft movement of air within the compartment contemplated, as in the afore said Robson patent) is eliminated. In fact, the aggregate cross sectional area between the overhead beams, available for air circulation is usually greater than the area required for the return air, so some cargo can be stowed between the beams without impeding the required flow of return air, thereby providing additional cargo capacity. The height of the clear space between each two adjacent decks can therefore be reduced resulting in a reduction in the total height of the ship with attendant savings in construction cost.

A further adavntage is that the air velocity throughout the cargo is more uniform avoiding the acceleration that is inherent when all the air is returned over the cargo to a fan suction plenum with resultant accelerated dehydration of fruit and most refrigerated cargoes. The channels also tend to insure that air does not by-pass the cargo space when the cargo is only partly stowed or is badly stowed, and the air flow through the cargo is with, rather than against, the natural convection currents created by air being heated as the cargo is cooled.

While the system has been shown in the drawings with transverse framing, it is equally applicable to ships with longitudinal framing, in which case the fan suction plenum is fore or aft of the compartment, or both, and no hull side ducts are required.

What is claimed is:
1. A ventilated ship cargo compartment construction comprising:
a first deck;
a second deck overhead with respect to said first deck;
spaced parallel beams supporting said overhead deck and forming a series of open overhead channels for passage of air parallel to and between said beams;
opposite vertical walls extending normal to said beams and connecting said decks;
opposite unapertured vertical walls extending parallel to said beams and connecting said decks and said normally extending walls to form a closed cargo compartment;
a series of air inlets spaced along at least one of said normally extending compartment walls adjacent but above the lower deck;
a series of air outlets spaced along at least one of the normally extending compartment walls adjacent but below said overhead deck adjacent the ends of said channels;
air delivery duct means extending along the outside of the inlet-containing compartment wall with decreasing cross sections progressively in one direction and communicating with said inlets;
air return duct means extending along the outside of the outlet-containing compartment wall with increasing cross sections progressively in the other direction and communicating with said outlets, and
fan and cooling means located outside of said compartment walls and communicating with said delivery and return duct means for circulating cooled air from said inlets upwardly through a cargo stowed in said compartment into said channels above said cargo and thence to said outlets without any substantial horizontal travel within said compartment in a direction normal to said spaced beams.

2. A construction as claimed in claim 1 wherein the parallel beams extend athwartship, the opposite walls extending normal to said beams are side walls extending along the sides of the ship, said air inlets and said air outlets are spaced along both said opposite side walls and said air delivery and air return duct means extend in vertical tiers between said side walls and the hull of the ship.

3. A construction as claimed in claim 1 wherein the compartment has a cargo-carrying grid on said first deck formed by a series of slats carried on spaced bearers at a height slightly greater than the height of said air inlets.

4. A construction as claimed in claim 1 wherein at least the tops of the air outlets lie above the lowest level of said overhead deck beams at their juncture with said outlet-containing wall.

5. A construction as claimed in claim 4 wherein said air outlets lie entirely above the lowest level of said overhead deck beams at their juncture with said outlet-containing wall.

6. A construction as claimed in claim 1 wherein the upper portions of the spaces between said beams contain insulation above said air channels.

References Cited

UNITED STATES PATENTS

| 136,393 | 3/1873 | Thompson | 114—211 |
|---------|--------|----------|---------|
| 2,160,831 | 6/1939 | Colby et al. | 114—211 |
| 2,483,704 | 10/1949 | Leigh | 98—33 |

MILTON BUCHLER, Primary Examiner

JAMES E. PITTENGER, Assistant Examiner

U.S. Cl. X.R.

98—33; 114—72